United States Patent
Liu et al.

(10) Patent No.: US 12,301,154 B2
(45) Date of Patent: May 13, 2025

(54) INTELLIGENT SYNCHRONOUS RECTIFICATION SYSTEM OF ELECTRONIC SPEED CONTROLLER, AND CONTROL METHOD FOR INTELLIGENT SYNCHRONOUS RECTIFICATION SYSTEM

(71) Applicant: Shenzhen Hobbywing Technology Co., Ltd., Shenzhen (CN)

(72) Inventors: Youhui Liu, Shenzhen (CN); Leilei Shi, Shenzhen (CN); Xiaoning Dai, Shenzhen (CN)

(73) Assignee: Shenzhen Hobbywing Technology Co., Ltd., Shenzhen (CN)

( * ) Notice: Subject to any disclaimer, the term of this patent is extended or adjusted under 35 U.S.C. 154(b) by 70 days.

(21) Appl. No.: 18/297,070

(22) Filed: Apr. 7, 2023

(65) Prior Publication Data

US 2023/0283209 A1    Sep. 7, 2023

Related U.S. Application Data

(63) Continuation of application No. PCT/CN2021/115678, filed on Aug. 31, 2021.

(30) Foreign Application Priority Data

May 26, 2021   (CN) .......................... 202110577757.7

(51) Int. Cl.
*H02P 6/17*     (2016.01)
*H02P 3/18*     (2006.01)
(Continued)

(52) U.S. Cl.
CPC ................ *H02P 6/085* (2013.01); *H02P 6/16* (2013.01)

(58) Field of Classification Search
CPC .... H02P 27/08; H02P 29/0241; H02P 29/024; H02P 25/14; H02P 29/00; H02P 29/032; H02P 6/14; H02P 7/04; H02P 6/16; H02P 2209/07; H02P 6/182; H02P 6/06; H02P 6/085; H02P 6/15; H02P 6/28; H02P 27/16; H02P 5/74; H02P 6/17; H02P 9/14;
(Continued)

(56) References Cited

U.S. PATENT DOCUMENTS 4,855,652 A * 8/1989 Yamashita ............... H02P 25/03
318/803
5,486,743 A   1/1996 Nagai
(Continued)

FOREIGN PATENT DOCUMENTS

CN        101154907 A      4/2008
CN        104734581 A      6/2015
(Continued)

*Primary Examiner* — Kawing Chan
*Assistant Examiner* — Charles S Laughlin
(74) *Attorney, Agent, or Firm* — IPRO, PLLC

(57) ABSTRACT

The present application relates to an intelligent synchronous rectification system of an electronic speed controller, and a control method for the intelligent synchronous rectification system. The system comprises: a Hall sensor, a second control module, a three-phase inverter, a first control module, a freewheeling measurement module, and a power source module. By means of the present application, the effects of decreasing a rectification loss and ensuring operation smoothness are both achieved.

5 Claims, 8 Drawing Sheets

(51) Int. Cl.
*H02P 6/08* (2016.01)
*H02P 6/16* (2016.01)

(58) Field of Classification Search
CPC .... H02P 2203/03; H02P 2203/09; H02P 3/14; H02P 6/186; H02P 25/034; H02P 7/29
See application file for complete search history.

(56) References Cited

U.S. PATENT DOCUMENTS

2019/0157994 A1* 5/2019 Prabhala .................. G01B 7/30
2019/0379315 A1* 12/2019 Karasawa ............... H02P 27/08

FOREIGN PATENT DOCUMENTS

| | | |
|---|---|---|
| CN | 109391177 A | 2/2019 |
| CN | 109818538 A | 5/2019 |
| CN | 109861591 A | 6/2019 |
| CN | 110460269 A | 11/2019 |
| CN | 110535378 A | 12/2019 |
| CN | 113193795 A | 7/2021 |
| JP | 2000236690 A | 8/2000 |

* cited by examiner

INTELLIGENT SYNCHRONOUS RECTIFICATION SYSTEM OF ELECTRONIC SPEED CONTROLLER, AND CONTROL METHOD FOR INTELLIGENT SYNCHRONOUS RECTIFICATION SYSTEM

CROSS-REFERENCE TO RELATED APPLICATION

This application is based upon and claims priority to Chinese Patent Application No. 202110577757.7, filed before China National Intellectual Property Administration on May 26, 2021 and entitled "INTELLIGENT SYNCHRONOUS RECTIFICATION SYSTEM OF ELECTRONIC SPEED CONTROLLER, AND CONTROL METHOD FOR INTELLIGENT SYNCHRONOUS RECTIFICATION SYSTEM" the entire contents of which are incorporated herein by reference.

TECHNICAL FIELD

The present disclosure relates to the field of synchronous rectification, and in particular, relates to an intelligent synchronous rectification system of an electronic speed controller, and a control method for the intelligent synchronous rectification system.

BACKGROUND

In electric remote control (RC) model cars, aircraft models and ship models, it is often necessary to use a brushless DC motor with smooth operation and light weight. Generally, the brushless DC motor is connected to an electronic speed controller, which is capable of adjusting a rotation speed of the brushless DC motor in response to a control signal. The electronic speed controller usually controls the rotation speed of the brushless DC motor by the pulse width modulation (PWM) technology, and the PWM is generally performed for an upper bridge MOSFET (metal-oxide semiconductor field-effect transistor) transistor whereas a lower bridge MOSFET transistor is usually constantly turned on. A motor winding coil and a freewheeling diode built in the MOSFET transistor form a freewheeling loop during two-phase conduction of the motor and a PWM_OFF phase of the MOSFET transistor, and freewheeling is generated. At the same time, the freewheeling is also generated in a commutation of the motor. Although the freewheeling diode protects other components in the circuit, the freewheeling diode has a large voltage drop and high freewheeling loss, which may also cause a huge bridge arm heat generation. This lowers an efficiency of the electronic speed controller.

In the conventional rectification technology, the split-tube synchronous rectification is adopted, and a dedicated power MOSFET transistors with an extremely low on-resistance are used to replace the freewheeling diodes to reduce rectification loss. The split-tube synchronous rectification is a simple version of synchronous rectification. In such synchronous rectification, there is no need to detect when the freewheeling ends, and a lower bridge MOSFET transistor needs to be turned on after an upper bridge MOSFET transistor is turned off. By application of such synchronous rectification to the electric RC model cars, rectification loss is reduced.

SUMMARY

To reduce rectification loss and smoothness of operation, the present disclosure provides an intelligent synchronous rectification system of an electronic speed controller, and a control method for the intelligent synchronous rectification system.

The present disclosure provides an intelligent synchronous rectification system of an electronic speed controller.

The intelligent synchronous rectification system of an electronic speed controller includes: a Hall sensor, disposed on an outer periphery of a brushless DC motor, and configured to acquire rotor position information of the brushless DC motor; a second control module, signally connected to the Hall sensor, configured to receive the rotor position information from the Hall sensor and generate a synchronous rectification enable or disable signal, and further configured to generate a freewheeling end signal; a three-phase inverter, electrically connected to a winding coil of the brushless DC motor, and configured to drive the brushless DC motor to rotate; a first control module, signally connected to the three-phase inverter, and configured to receive the synchronous rectification enable or disable signal or the freewheeling end signal from the second control module, and control the three-phase inverter based on the synchronous rectification enable or disable signal or the freewheeling end signal; a freewheeling detecting module, electrically connected between the three-phase inverter and the brushless DC motor, signally connected to the second control module, and configured to detect a three-phase current in the three-phase inverter and send a signal to the second control module; and a power module, configured to supply power to the three-phase inverter, the first control module, the second control module, the Hall sensor, and the freewheeling detecting module.

In the above technical solution, upon acquiring a rotor position signal, the Hall sensor sends the rotor position signal to the second control module; the second control module acquires a real-time rotation speed signal of the brushless DC motor based on the rotor position signal, compares the real-time rotation speed signal with a predetermined rotation speed signal, and sends a PWM signal to the first control module; and the first control module drives the three-phase inverter to perform pulse width modulation (PWM). The freewheeling detecting module detects in real time the three-phase current in the three-phase inverter, and sends a detection signal to the second control module; the second control module determines, based on the detection signal, whether freewheeling ends; upon acquiring a freewheeling end signal, the second control module sends a rectification disable signal to the first control module; and the first control module controls the three-phase inverter to disable the synchronous rectification. During motion of electric RC model cars, upon completion of the freewheeling, the synchronous rectification is timely disabled, such that heat generation is reduced, and the active braking effect in a retarding period of the electric RC model cars is mitigated. In this way, the entire power system is safe, stable, and efficient.

The present disclosure provides a control method for the intelligent synchronous rectification system.

The method includes: acquiring a motor rotation speed set signal and a real-time rotation speed signal, comparing the motor rotation speed set signal with the real-time rotation speed signal, and generating a pulse width modulated signal by performing pulse width modulation based on a comparison result;

generating, based on the pulse width modulated signal, a three-phase inverter on signal configured to enable synchronous rectification of the three-phase inverter; and acquiring a freewheeling current in real time, and acquiring a freewheeling end signal based on a variation of the freewheeling current; and generating, based on the freewheeling end signal, a three-phase inverter off signal configured to disable synchronous rectification of the three-phase inverter.

In the above technical solution, upon start of the freewheeling, the synchronous rectification is enabled, and upon completion of the freewheeling, the synchronous rectification is timely disabled, such that heat generation is reduced, and the active braking effect in a retarding period of the electric RC model cars is mitigated. In this way, the entire power system is safe, stable, and efficient.

In summary, the present disclosure achieves at least the following technical effects:

1. By configuration of the freewheeling detecting module and the second control module, the second control module determines, based on the detection signal, whether the freewheeling ends, and upon completion of the freewheeling, the synchronous rectification is timely disabled. In this way, heat generation may be reduced, and the active braking effect in a retarding period of the electric RC model cars is mitigated, that is, rectification loss of the electric RC model cars is reduced and smoothness of operation of the electric RC model cars and other models is enhanced.

2. The second control module calculates an estimated freewheeling time point and compares the estimated freewheeling time point with the time point when the pulse width modulation control of the three-phase inverter is enabled, the synchronous rectification is disabled prior to the time point when the pulse width modulation control is enabled, such that the circuit and devices or elements are protected.

BRIEF DESCRIPTION OF THE DRAWINGS

One or more embodiments are illustrated by way of example, and not by limitation, in the accompanying drawings, wherein components having the same reference numeral designations represent like components throughout. The drawings are not to scale, unless otherwise disclosed.

Figure 1:
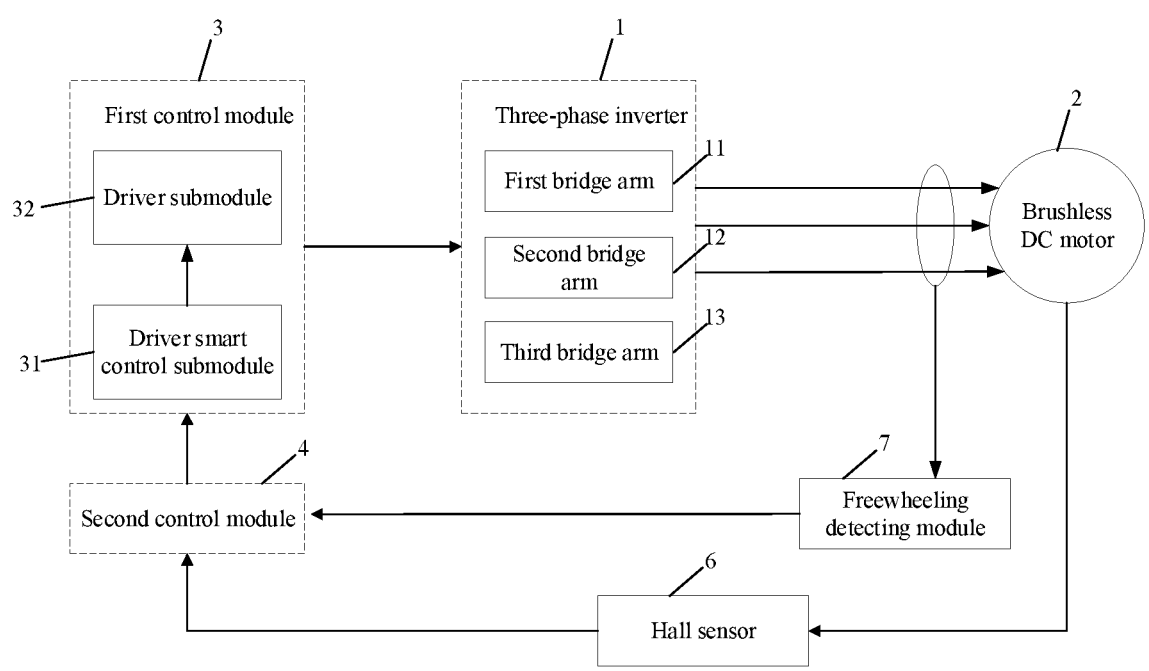
FIG. 1 is an overall functional block diagram according to a first embodiment of the present disclosure.

Reference numerals and denotations thereof: 1—three-phase inverter; 11—first bridge arm; 12—second bridge arm; 13—third bridge arm; 2—brushless DC motor; 3—first control module; 31—driver smart control submodule; 32—driver submodule; 4—second control module; 41—first control submodule; 42—second control submodule; 5—power module; 6—Hall sensor; and 7—freewheeling detecting module.

DETAILED DESCRIPTION

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical," "horizontal," "left," "right," and similar expressions are for illustration purposes.

In addition, technical features involved in various embodiments of the present disclosure described hereinafter may be combined as long as these technical features are not in conflict.

With regard to the above-mentioned related technology, the corresponding lower bridge MOSFET transistor in the split-tube synchronous rectification technology is conducted, and the winding of this phase is clamped to ground, and since the PWM modulation mode with the lower bridge transistor being normally turned on is selected, the winding of the corresponding phase may also be grounded. In this case, the two-phase winding is directly short-circuited and grounded, which may result in a short-circuiting braking effect of the two-phase winding. As a result, the electric RC model cars may have an active braking effect during the deceleration stage, resulting in frustration and inconvenience in operation and control. The inventors believe that there are defects that the rectification loss and the operation fluency may not be both reduced.

The present disclosure is further described with reference to FIG. 1 to FIG. 8.

Some embodiments of the present disclosure provide a smart synchronous rectifier system for an electronic speed controller.

First Embodiment

Figure 2:
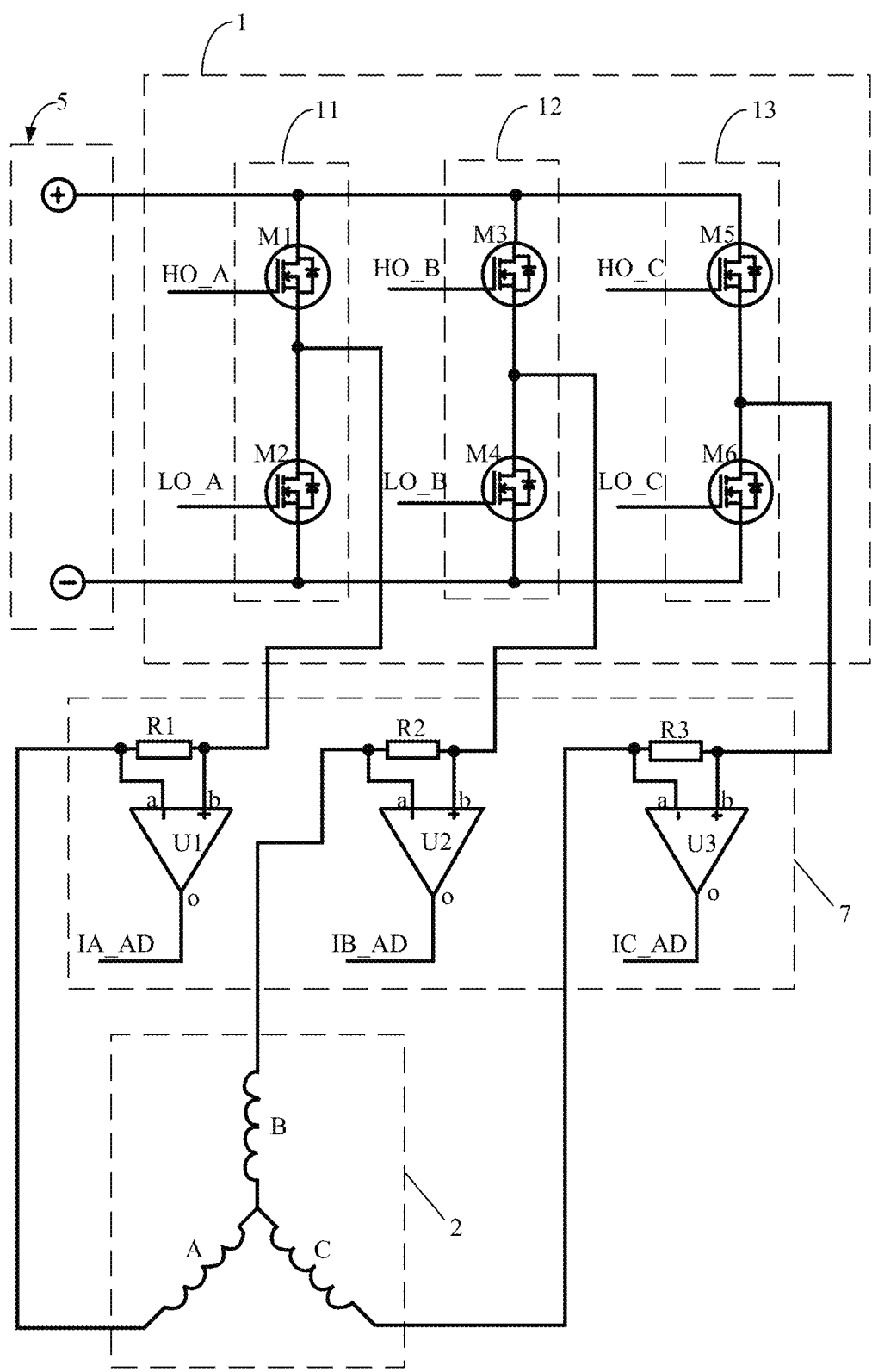
FIG. 2 is a schematic diagram of partial circuit structure of a second control module according to the first embodiment of the present disclosure.

Referring to FIG. 1 and FIG. 2, the intelligent synchronous rectification system of an electronic speed controller includes a three-phase inverter 1, a first control module 3, a second control module 4, and a power module 5. The three-phase inverter 1 is connected to three winding coils of a brushless DC motor 2; the first control module 3 is signally connected to the three-phase inverter 1, and is configured to control the three-phase inverter 1 to perform synchronous rectification; and the second control module 4 is signally connected to the first control module 3, and is configured to send a rectification signal and process a freewheeling detection signal. A freewheeling detecting module 7 is electrically connected between the three-phase inverter 1 and the brushless DC motor 2. The freewheeling detecting module 7 is signally connected to the second control module 4, and configured to detect a three-phase current in the three-phase inverter 1 and send a signal to the second control module 4. A Hall sensor 6 is disposed on the brushless DC motor 2. The Hall sensor 6 is signally connected to the second control module 4, and is configured to detect a rotor position signal of the brushless DC motor 2. The power module 5 is configured to supply power to the three-phase inverter 1, the first control module 3, the second control module 4, the Hall sensor 6, and the free-wheeling detecting module 7.

Figure 3:
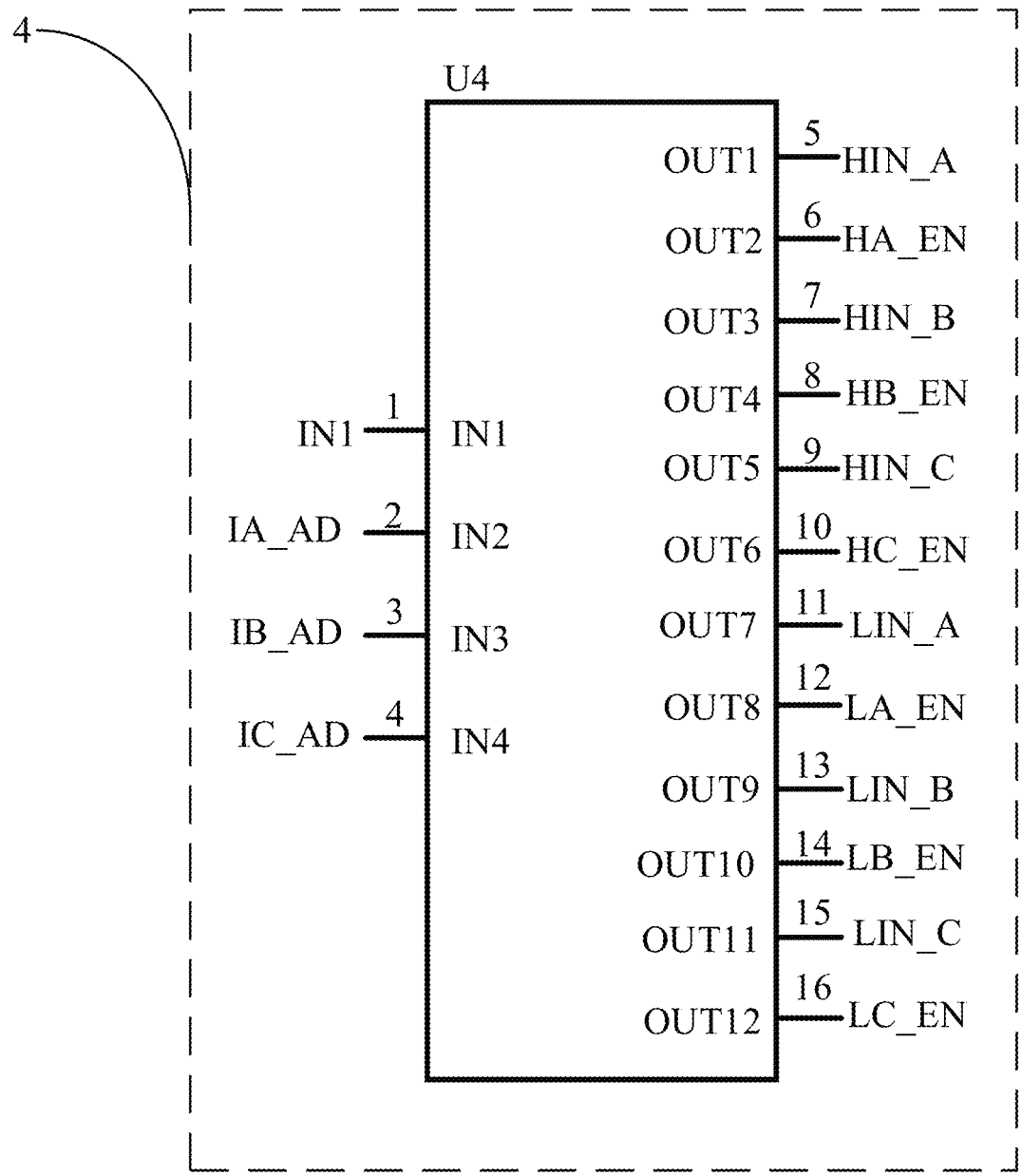
FIG. 3 is a schematic diagram of pins of the second control module according to the first embodiment of the present disclosure.

Referring to FIG. 2 and FIG. 3, since the present disclosure is mainly applicable to models such as an electric RC model car, and small-sized devices are needed, the second control module 4 according to the present disclosure preferably employs a microcontroller unit (MCU). The model of the MCU may be STM32F3 series, EFM32 series, STM32G4 series, or GD32F3 series, and is preferably STM32F373RC series in the present disclosure. With the above technical solution, upon acquiring a rotor position signal of the brushless DC motor 2, the Hall sensor 6 sends the rotor position signal to an IN1 pin of the second control module 4; the second control module 4 acquires a real-time rotation speed signal of the brushless DC motor 2 based on the rotor position signal, compares the real-time rotation speed signal with a predetermined rotation speed signal, and sends a rectification signal to the first control module 3; and the first control module 3 drives the three-phase inverter 1 to operate. The freewheeling detecting module 7 detects in real time the three-phase current in the three-phase inverter 1, and sends a detection signal to the second control module 4; the second control module 4 determines, based on the detection signal, whether freewheeling ends; upon acquiring a freewheeling end signal, the second control module 4 sends a rectification disable signal to the first control module 3; and the first control module 3 controls the three-phase inverter 1 to disable the synchronous rectification. During motion of electric RC model cars, upon completion of the freewheeling, the synchronous rectification is timely disabled, such that heat generation is reduced, and the active braking effect in a retarding period of the electric RC model cars is mitigated. In this way, the entire power system is safe, stable, and efficient.

Referring to FIG. 1 and FIG. 2, winding coils of three phases of the brushless DC motor 2 according to the present disclosure employ a star connection form, and phase A, phase B, and phase C are set as the three phases of the brushless DC motor 2. Phase A, phase B, and phase C are all connected to the three-phase inverter 1, and the brushless DC motor 2 is driven by the three-phase inverter 1. In the present disclosure, the power module 5 includes a first power supply unit and a second power supply unit (which are not illustrated in the drawings). The first power supply unit is configured to supply power to the brushless DC motor 2, the three-phase inverter 1, and the freewheeling detecting module 7. The second power supply unit is configured to supply power to the first control module 3, the second control module 4, and the Hall sensor 6. Independent power supply prevents the first control module 3, the second control module 4, and the Hall sensor 6 from being affected by interference caused by rotation of the motor.

Referring to FIG. 2, basic circuitry of the three-phase inverter 1 includes a first bridge arm 11, a second bridge arm 12, and a third bridge arm 13. One terminal of each of the first bridge arm 11, the second bridge arm 12, and the third bridge arm 13 is electrically connected to a positive electrode of the first power supply unit, and the other terminal of each of the first bridge arm 11, the second bridge arm 12, and the third bridge arm 13 is electrically connected to a negative electrode of the first power supply unit. The first bridge arm 11, the second bridge arm 12, and the third bridge arm 13 are all constituted by a plurality of MOSFET transistors. Each of the MOSFET transistors is internally provided with freewheeling diode. The MOSFET transistor proximal to the positive electrode of the first power supply unit is an upper bridge MOSFET transistor, and the MOSFET transistor proximal to the negative electrode of the first power supply unit is a lower bridge MOSFET transistor.

Referring to FIG. 2, the first bridge arm 11 includes two N-channel MOSFET transistors M1 and M2, wherein a drain electrode of M1 is electrically connected to the positive electrode of the first power supply unit, and a source electrode of M2 is electrically connected to the negative electrode of the first power supply unit, a source electrode of M1 is electrically connected to a drain electrode of M2, and gate electrodes of M1 and M2 are both signally connected to the first control module 3. Correspondingly, the second bridge arm 12 includes two N-channel MOSFET transistors M3 and M4, wherein a drain electrode of M3 is electrically connected to the positive electrode of the first power supply unit, and a source electrode of M4 is electrically connected to the negative electrode of the first power supply unit, a source electrode of M3 is electrically connected to a drain electrode of M4, and gate electrodes of M3 and M4 are both signally connected to the first control module 3. The third bridge arm 13 includes two N-channel MOSFET transistors M5 and M6, wherein a drain electrode of M5 is electrically connected to the positive electrode of the first power supply unit, and a source electrode of M6 is electrically connected to the negative electrode of the first power supply unit, a source electrode of M5 is electrically connected to a drain electrode of M6, and gate electrodes of M5 and M6 are both signally connected to the first control module 3.

Referring to FIG. 2, the freewheeling detecting module 7 detects in real time a three-phase current in the three-phase inverter 1, and outputs the detected three-phase current to the second control module 4 to process a current variation signal, such that a freewheeling state is monitored in real time. The freewheeling detecting module 7 is constituted by a plurality of resistors and a plurality of operational amplifier corresponding to the plurality of resistors. According to the present disclosure, the plurality of resistors are respectively connected between a source electrode of an upper bridge MOSFET transistor and a lower bridge MOSFET transistor, and an inverting input terminal a and a non-inverting input terminal b of the operational amplifier are respectively disposed at two terminals of a corresponding resistor. The first bridge arm 11 is connected to a first resistor R1, wherein the other terminal of the first resistor R1 is connected to phase A of the brushless DC motor 2. The second bridge arm 12 is connected to a second resistor R2, wherein the other terminal of the second resistor R2 is connected to the phase B of the brushless DC motor 2. The third bridge arm 13 is connected to a third resistor R3, wherein the other terminal of the third resistor R3 is connected to the phase C of the brushless DC motor 2.

Referring to FIG. 2, to reduce shunting of the three phases of the brushless DC motor 2, the first resistor R1, the second resistor R2, and the third resistor R3 all have an extremely low resistance. In the present disclosure, the resistances of the first resistor R1, the second resistor R2, and the third resistor R3 are all preferably 0.25 mOhm.

Referring to FIG. 2 and FIG. 3, an operational amplifier U1 is connected between two terminals of the first resistor R1, wherein an output terminal o of the operational amplifier U1 is signally connected to the second control module 4; an operational amplifier U2 is connected to two terminals of the second resistor R2, wherein an output terminal o of the operational amplifier U2 is signally connected to the second control module 4; and an operational amplifier U3 is connected between two terminals of the third resistor R3, wherein an output terminal o of the operational amplifier U3 is signally connected to the second control module 4. Since a current of the first resistor corresponds to a current of phase A, a current of the second resistor corresponds to a current of phase B, and a current of the third resistor corresponds to a current of phase C, upon amplification by the corresponding operational amplifiers, current sampling values IA_AD, IB_AD, and IC_AD corresponding to phases A, B, and C are respectively acquired. The current sampling values IA_AD, IB_AD, and IC_AD are input to a pin IN2, a pin IN3, and a pin IN4 of the second control module 4.

Figure 4:
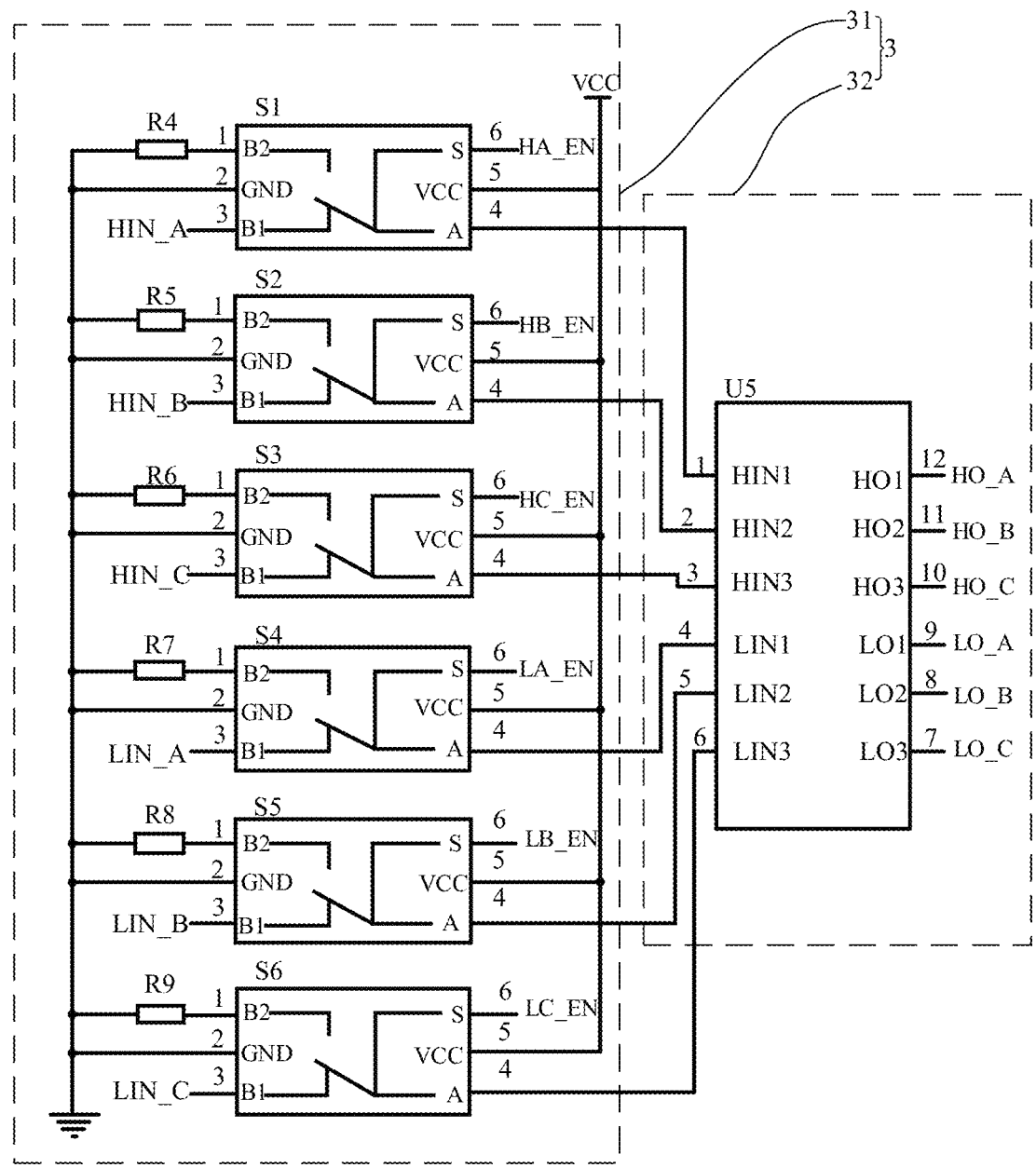
FIG. 4 is a schematic diagram of circuit structure of a first control module according to the first embodiment of the present disclosure.

Referring to FIG. 4, the first control module 3 includes a driver smart control submodule 31 and a driver submodule 32. The driver smart control submodule 31 is signally connected to both the driver submodule 32 and the second control module 4. The driver submodule 32 is further signally connected to the gate electrodes of the six MOSFET transistors of the three-phase inverter 1. The driver smart control submodule 31 is configured to receive a control signal from the second control module 4, and transmit the control signal to the driver submodule 32. The driver submodule 32 is configured to process the control signal and control turn-on or turn-off of the six MOSFET transistors. When freewheeling starts, the driver smart control submodule 31 receives a synchronous rectification enable signal of the second control module 4, and sends the synchronous rectification enable signal to the driver submodule 32. The driver submodule 32 drives the corresponding MOSFET transistor to be turned on and turned off.

Referring to FIG. 2 and FIG. 4, the driver smart control submodule 31 includes a plurality of signal selection switch units and a peripheral circuit thereof. Each of the signal selection switch units correspondingly controls turn-on or turn-off of one MOSFET transistor. Totally six signal selection switch units are deployed corresponding to the six MOSFET transistors. The driver smart control submodule 31 is provided with a signal selection switch unit S1 corresponding to the MOSFET transistor M1; wherein a first pin B2 of the signal selection switch unit S1 is connected to a pull-down resistor R4, the other terminal of the pull-down resistor R4 is connected to a negative electrode of the second power supply unit, a second pin GND of the signal selection switch unit S1 is connected to the negative electrode of the second power supply unit, a third pin B1 of the signal selection switch unit S1 is connected to a first output pin HIN_A of the second control module 4, a fourth pin A of the signal selection switch unit S1 is connected to a first input pin HIN1 of the MOSFET transistor M1 corresponding to the driver submodule 32, a fifth pin of the signal selection switch unit S1 is connected to a positive electrode of the second power supply unit, and a sixth pin of the signal selection switch unit S1 is connected to a second output pin HA_EN of the second control module 4. The signal selection switch unit S1 is internally provided with a signal selection switch. In the case that the second output pin HA_EN of the second control module 4 outputs a low-level signal, the fourth pin A of the signal selection switch unit S1 is conducted to the third pin B1 of the signal selection switch unit S1, and the first output pin HIN_A of the second control module 4 sends the low-level signal to the first input pin HIN1 of the driver submodule 32 to control turn-on or turn-off of the MOSFET transistor M1. In the case that the second output pin HA_EN of the second control module 4 outputs a high-level signal, the fourth pin A of the signal selection switch unit S1 is conducted to the first pin B2 of the signal selection switch unit S1, and the second output pin HA_EN of the second control module 4 sends the high-level signal to the first input pin HIN1 of the driver submodule 32 to control turn-on or turn-off of the MOSFET transistor M1.

Referring to FIG. 2 and FIG. 4, the driver smart control submodule 31 is provided with a signal selection switch unit S2 corresponding to the MOSFET transistor M2; wherein a first pin B2 of the signal selection switch unit S2 is connected to a pull-down resistor R5, the other terminal of the pull-down resistor R5 is connected to the negative electrode of the second power supply unit, a second pin GND of the signal selection switch unit S2 is connected to the negative electrode of the second power supply unit, a third pin B1 of the signal selection switch unit S2 is connected to a third output pin HIN_B of the second control module 4, a fourth pin A of the signal selection switch unit S2 is connected to a second input pin HIN2 of the MOSFET transistor M2 corresponding to the driver submodule 32, a fifth pin of the signal selection switch unit S2 is connected to the positive electrode of the second power supply unit, and a sixth pin of the signal selection switch unit S2 is connected to a fourth output pin HB_EN of the second control module 4. The signal selection switch unit S2 is internally provided with a signal selection switch. In the case that the fourth output pin HB_EN of the second control module 4 outputs a low-level signal, the fourth pin A of the signal selection switch unit S2 is conducted to the third pin B1 of the signal selection switch unit S2, the third pin HIN_B of the second control module 4 sends the low-level signal to the second input pin HIN2 of the driver submodule 32 to control turn-on or turn-off of the MOSFET transistor M2. In the case that the fourth output pin HB_EN of the second control module 4 outputs a high-level signal, the fourth pin A of the signal selection switch unit S2 is conducted to the first pin B2 of the signal selection switch unit S2, and the fourth output pin HB_EN of the second control module 4 sends the high-level signal to the second input pin HIN2 of the driver submodule 32 to control turn-on or turn-off of the MOSFET transistor M2.

Referring to FIG. 2 and FIG. 4, the driver smart control submodule 31 is provided with a signal selection switch unit S3 corresponding to the MOSFET transistor M3; wherein a first pin B2 of the signal selection switch unit S3 is connected to a pull-down resistor R6, the other terminal of the pull-down resistor R6 is connected to the negative electrode of the second power supply unit, a second pin GND of the signal selection switch unit S3 is connected to the negative electrode of the second power supply unit, a third pin B1 of the signal selection switch unit S3 is connected to a fifth output pin HIN_C of the second control module 4, a fourth pin A of the signal selection switch unit S3 is connected to a third input pin HIN3 of the MOSFET transistor M3 corresponding to the driver submodule 32, a fifth pin of the signal selection switch unit S3 is connected to the positive electrode of the second power supply unit, and a sixth pin of the signal selection switch unit S3 is connected to a sixth output pin HC_EN of the second control module 4. The signal selection switch unit S3 is internally provided with a signal selection switch. In the case that the sixth output pin HC_EN of the second control module 4 outputs a low-level signal, the fourth pin A of the signal selection switch unit S3 is conducted to the third pin B1 of the signal selection switch unit S3, the fifth output pin HIN_C of the second control module 4 sends the low-level signal to the third input pin HIN3 of the driver submodule 32 to control turn-on or turn-off of the MOSFET transistor M3. In the case that the sixth output pin HC_EN of the second control module 4 outputs a high-level signal, the fourth pin A of the signal selection switch unit S3 is conducted to the first pin B2 of the signal selection switch unit S3, and the sixth output pin HC_EN of the second control module 4 sends the high-level signal to the third input pin HIN3 of the driver submodule 32 to control turn-on or turn-off of the MOSFET transistor M3.

Referring to FIG. 2 and FIG. 4, the driver smart control submodule 31 is provided with a signal selection switch unit S4 corresponding to the MOSFET transistor M4; wherein a first pin B2 of the signal selection switch unit S4 is connected to a pull-down resistor R7, the other terminal of the pull-down resistor R7 is connected to the negative electrode of the second power supply unit, a second pin GND of the signal selection switch unit S4 is connected to the negative electrode of the second power supply unit, a third pin B1 of the signal selection switch unit S4 is connected to a seventh output pin LIN_A of the second control module 4, a fourth pin A of the signal selection switch unit S4 is connected to a fourth input pin HIN4 of the MOSFET transistor M4 corresponding to the driver submodule 32, a fifth pin of the signal selection switch unit S4 is connected to the positive electrode of the second power supply unit, and a sixth pin of the signal selection switch unit S4 is connected to an eighth output pin LA_EN of the second control module 4. The signal selection switch unit S4 is internally provided with a signal selection switch. In the case that the eighth output pin LA_EN of the second control module 4 outputs a low-level signal, the fourth pin A of the signal selection switch unit S4 is conducted to the third pin B1 of the signal selection switch unit S4, and the seventh output pin LIN_A of the second control module 4 sends the low-level signal to the fourth input pin HIN4 of the driver submodule 32 to control turn-on or turn-off of the MOSFET transistor M4. In the case that the eighth output pin LA_EN of the second control module 4 outputs a high-level signal, the fourth pin A of the signal selection switch unit S4 is conducted to the first pin B2 of the signal selection switch unit S4, and the eighth output pin LA_EN of the second control module 4 sends the high-level signal to the fourth input pin HIN4 of the driver submodule 32 to control turn-on or turn-off of the MOSFET transistor M4.

Referring to FIG. 2 and FIG. 4, the driver smart control submodule 31 is provided with a signal selection switch unit S5 corresponding to the MOSFET transistor M5; wherein a first pin B2 of the signal selection switch unit S5 is connected to a pull-down resistor R8, the other terminal of the pull-down resistor R8 is connected to the negative electrode of the second power supply unit, a second pin GND of the signal selection switch unit S5 is connected to the negative electrode of the second power supply unit, a third pin B1 of the signal selection switch unit S5 is connected to a ninth output pin LIN_B of the second control module 4, a fourth pin A of the signal selection switch unit S5 is connected to a fifth input pin HIN5 of the MOSFET transistor M5 corresponding to the driver submodule 32, a fifth pin of the signal selection switch unit S5 is connected to the positive electrode of the second power supply unit, and a sixth pin of the signal selection switch unit S5 is connected to a tenth output pin LB_EN of the second control module 4. The signal selection switch unit S5 is internally provided with a signal selection switch. In the case that the tenth output pin LB_EN of the second control module 4 outputs a low-level signal, the fourth pin A of the signal selection switch unit S5 is conducted to the third pin B1 of the signal selection switch unit S5, and the ninth output pin LIN_B of the second control module 4 sends the low-level signal to the fifth input pin HIN5 of the driver submodule 32 to control turn-on or turn-off of the MOSFET transistor M5. In the case that the tenth output pin LB_EN of the second control module 4 outputs a high-level signal, the fourth pin A of the signal selection switch unit S5 is conducted to the first pin B2 of the signal selection switch unit S5, and the tenth output pin LB_EN of the second control module 4 sends the high-level signal to the fifth input pin HIN5 of the driver submodule 32 to control turn-on or turn-off of the MOSFET transistor M5.

Referring to FIG. 2 and FIG. 4, the driver smart control submodule 31 is provided with a signal selection switch unit S6 corresponding to the MOSFET transistor M6; wherein a first pin B2 of the signal selection switch unit S6 is connected to a pull-down resistor R8, the other terminal of the pull-down resistor R8 is connected to the negative electrode of the second power supply unit, a second pin GND of the signal selection switch unit S6 is connected to the negative electrode of the second power supply unit, a third pin B1 of the signal selection switch unit S6 is connected to an eleventh output pin LIN_C of the second control module 4, a fourth pin A of the signal selection switch unit S6 is connected to a sixth input pin HIN6 of the MOSFET transistor M6 corresponding to the driver submodule 32, a fifth pin of the signal selection switch unit S6 is connected to the positive electrode of the second power supply unit, and a sixth pin of the signal selection switch unit S6 is connected to a twelfth output pin LC_EN of the second control module 4. The signal selection switch unit S6 is internally provided with a signal selection switch. In the case that the twelfth output pin LC_EN of the second control module 4 outputs a low-level signal, the fourth pin A of the signal selection switch unit S6 is conducted to the third pin B1 of the signal selection switch unit S6, and the eleventh output pin LIN_C of the second control module 4 sends the low-level signal to the sixth input pin HIN6 of the driver submodule 32 to control turn-on or turn-off of the MOSFET transistor M6. In the case that the twelfth output pin LC_EN of the second control module 4 outputs a high-level signal, the fourth pin A of the signal selection switch unit S6 is conducted to the first pin B2 of the signal selection switch unit S6, and the twelfth output pin LC_EN of the second control module 4 sends the high-level signal to the sixth input pin HIN6 of the driver submodule 32 to control turn-on or turn-off of the MOSFET transistor M6.

Referring to FIG. 2 and FIG. 4, a first output pin HO1 on the driver submodule 32 is connected to the gate electrode of the MOSFET transistor M1, and HO_1 outputs a control signal HO_A to the MOSFET transistor M1, such that turn-on or turn-off of the MOSFET transistor are controlled; a second output pin HO2 on the driver submodule 32 is connected to the gate electrode of the MOSFET transistor M3, and HO_2 outputs a control signal HO_B to the MOSFET transistor M3, such that turn-on or turn-off of the MOSFET transistor M3 are controlled; a third output pin HO3 on the driver submodule 32 is connected to the gate electrode of the MOSFET transistor M5, and HO_3 outputs a control signal HO_C to the MOSFET transistor M5, such that turn-on or turn-off of the MOSFET transistor M5 is controlled; a fourth output pin LO1 on the driver submodule 32 is connected to the gate electrode of the MOSFET transistor M2, and LO_1 outputs a control signal LO_A to the MOSFET transistor M2, such that turn-on or turn-off of the MOSFET transistor M2 is controlled; a fifth output pin LO2 on the driver submodule 32 is connected to the gate electrode of the MOSFET transistor M4, and LO_2 outputs a control signal LOB to the MOSFET transistor M4, such that turn-on or turn-off of the MOSFET transistor M4 is controlled; and a sixth output pin LO3 on the driver submodule 32 is connected to the gate electrode of the MOSFET transistor M6, and LO_3 outputs a control signal LO_C to the MOSFET transistor M6, such that turn-on or turn-off of the MOSFET transistor M6 is controlled.

Figure 5:
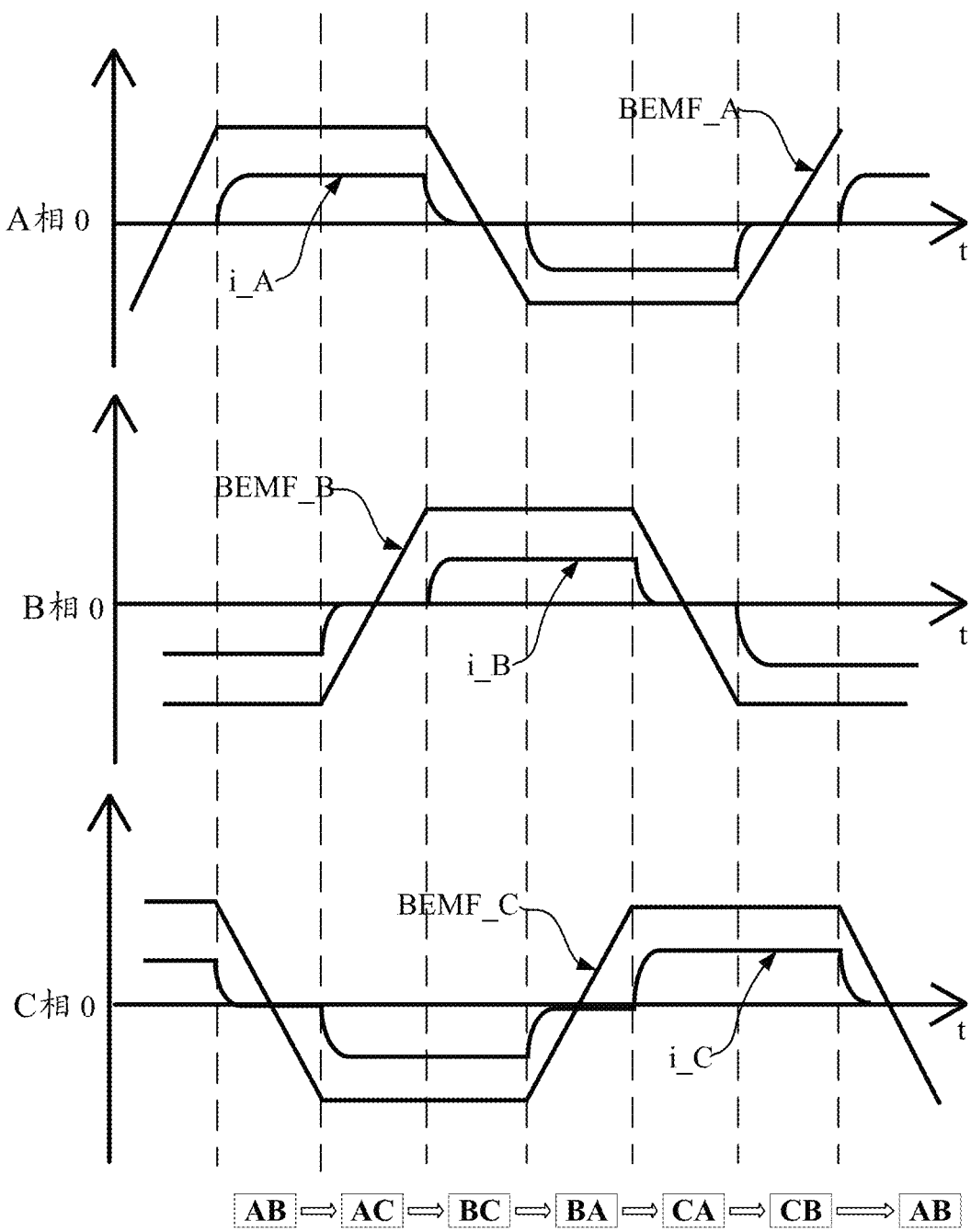
FIG. 5 is a schematic diagram of a commutation and freewheeling cycle of a brushless DC motor according to the first embodiment of the present disclosure.

Referring to FIG. 5, within one cycle of the brushless DC motor 2, a two-two conduction sequence is as follows: phase A and phase B are conducted, phase A and phase C are conducted, phase B and phase C are conducted, phase B and phase A are conducted, phase C and phase A are conducted, and phase C and phase B are conducted. Where the motor reverses, the conduction sequence is reversed.

Referring to FIG. 2 and FIG. 5, during a commutation from phases AB to phases AC, a flow direction of a conduction current is changed from:

the positive electrode of the first power supply unit—>the MOSFET transistor M1—>the first resistor R1—>the phase A winding coil of the brushless DC motor 2—>the phase B winding coil of the brushless DC motor 2—>the second resistor R2—>the MOSFET transistor M4—>the negative electrode of the first power supply unit to the positive electrode of the first power supply unit—>the MOSFET transistor M1—>the first resistor R1—>the phase A winding coil of the brushless DC motor 2—>the phase C winding coil of the brushless DC motor 2—>the third resistor R3—>the MOSFET transistor M6—>the negative electrode of the first power supply unit.

At the phase B winding coil of the brushless DC motor 2, a counter electromotive force BEMF_B is generated, a freewheeling current is correspondingly generated, the second control module 4 outputs a high-level control signal, and the high-level control signal is transmitted to the signal selection switch unit S3 of the driver smart control submodule 31 via the fifth output pin HIN_C. In this case, the fourth pin A and the third pin B1 of the signal selection switch unit S3 are conducted, such that the high-level control signal is sent to the third input pin HIN3 of the driver submodule 32. Upon receiving and processing the signal, the driver submodule 32 outputs a high-level signal HO_B to the gate electrode of the MOSFET transistor M3 via the second output pin HO2 of the driver submodule 32, and the MOSFET transistor M3 is turned on, such that a complete freewheeling path is formed, that is, the synchronous rectification is enabled. In this case, a freewheeling direction is as follows:

the phase B winding coil of the brushless DC motor 2—>the second resistor R2—>the MOSFET transistor M3—>the MOSFET transistor M1—>the first resistor R1—>the phase A winding coil of the brushless DC motor 2—>the phase B winding coil of the brushless DC motor 2.

In this case, the first resistor R1 is in an AC-phase loop, a current is constantly present, a freewheeling current is present in the second resistor R2, and as the freewheeling ends, the freewheeling current progressively decreases and eventually becomes zero. In the variation process of the current flowing via the second resistor R2, the operational amplifier U2 connected between the two terminals of the second resistor R2 constantly sends an acquired current sampling value IB_AD to the second control module 4; in the case that the sampling value IB_AD is zero, the second control module 4 detects that the freewheeling ends, the second control module 4 sends a high-level control signal, and the high-level control signal is transmitted to the signal selection switch unit S3 of the driver smart control submodule 31 via the sixth output pin HC_EN of the second control module 4. In this case, the fourth pin A and the first pin B2 of the signal selection switch unit S3 are conducted, and the sixth output pin HC_EN of the second control module 4 sends the signal to the third input pin HIN3 of the driver submodule 32. Upon receiving and processing the signal, the driver submodule 32 outputs a high-level signal HO_B to the gate electrode of the MOSFET transistor M3 via the second output pin HO2 of the driver submodule 32, and the MOSFET transistor M3 is turned off, that is, the synchronous rectification is disabled.

During motion of electric RC model cars, the synchronous rectification is timely disabled, such that heat generation is reduced, and the case where two phases of winding coils are directly short-circuited and connected to the ground in a retarding period of the electric RC model cars is prevented, and the active braking effect is removed. In this way, the entire power system is safe, stable, and efficient.

Referring to FIG. 2 and FIG. 5, during a commutation from phases AC to phases BC, a freewheeling processing manner is consistent with that in the commutation from phases AB to phases AC, and a freewheeling start signal is transmitted as follows:

At the phase A winding coil of the brushless DC motor 2, a counter electromotive force BEMF_A is generated, a freewheeling current is correspondingly generated, the second control module 4 generates a high-level control signal, and the high-level control signal is transmitted to the signal selection switch unit S2 of the driver smart control submodule 31 via the third output pin HIN_B. In this case, the fourth pin A and the third pin B1 of the signal selection switch unit S2 are conducted, such that the high-level control signal is sent to the second input pin HIN2 of the driver submodule 32. Upon receiving and processing the signal, the driver submodule 32 outputs a low-level signal LO_A to the gate electrode of the MOSFET transistor M2 via the fourth output pin LO1 of the driver submodule 32, and the MOSFET transistor M2 is turned on, such that a complete freewheeling path is formed, that is, the synchronous rectification is enabled. In this case, the freewheeling direction is as follows:

the phase A winding coil of the brushless DC motor 2—>the phase C winding coil of the brushless DC motor 2—>the third resistor R3—>the MOSFET transistor M6—>the MOSFET transistor M2—>the first resistor R1—>the phase A winding coil of the brushless DC motor 2.

In this case, the third resistor R3 is in a BC-phase loop, a current is constantly present, a freewheeling current is present in the first resistor R1, and as the freewheeling ends, the freewheeling current progressively decreases and eventually becomes zero. In the variation process of the current flowing via the first resistor R1, the operational amplifier U1 connected between the two terminals of the first resistor R1 constantly sends an acquired current sampling value IA_AD to the second control module 4; in the case that the sampling value IA_AD is zero, the second control module 4 detects that the freewheeling ends, the second control module 4 sends a high-level control signal, and the high-level control signal is transmitted to the signal selection switch unit S2 of the driver smart control submodule 31 via the fourth output pin HB_EN of the second control module 4. In this case, the fourth pin A and the first pin B2 of the signal selection switch unit S2 are conducted, and the fourth output pin HB_EN of the second control module 4 sends the signal to the second input pin HIN2 of the driver submodule 32. Upon receiving and processing the signal, the driver submodule 32 outputs a low-level signal LO_A to the gate electrode of the MOSFET transistor M2 via the fourth output pin LO1 of the driver submodule 32, and the MOSFET transistor M2 is turned off, that is, the synchronous rectification is disabled.

Referring to FIG. 2 and FIG. 5, during a commutation from phases BC to phases BA, a freewheeling start signal is transmitted as follows:

At the phase A winding coil of the brushless DC motor 2, a counter electromotive force BEMF_C is generated, a freewheeling current is correspondingly generated, the second control module 4 generates a high-level control signal, and the high-level control signal is transmitted to the signal selection switch unit S5 of the driver smart control submodule 31 via the ninth output pin LIN_B. In this case, the fourth pin A and the third pin B1 of the signal selection switch unit S5 are conducted, such that the high-level control signal is sent to the fifth input pin HIN5 of the driver submodule 32. Upon receiving and processing the signal, the driver submodule 32 outputs a high-level signal HO_C to the gate electrode of the MOSFET transistor M5 via the third output pin HO3 of the driver submodule 32, and the MOSFET transistor M5 is turned on, such that a complete freewheeling path is formed, that is, the synchronous rectification is enabled. In this case, the freewheeling direction is as follows:

the phase C winding coil of the brushless DC motor 2—>the third resistor R3—>the MOSFET transistor M5—>the MOSFET transistor M3—>the second resistor R2—>the phase B winding coil of the brushless DC motor 2—>the phase C winding coil of the brushless DC motor 2.

In this case, the second resistor R2 is in a BA-phase loop, a current is constantly present, a freewheeling current is present in the third resistor R3, and as the freewheeling ends, the freewheeling current progressively decreases and eventually becomes zero. In the variation process of the current flowing via the third resistor R3, the operational amplifier U3 connected between the two terminals of the third resistor R3 constantly sends an acquired current sampling value IC_AD to the second control module 4; in the case that the sampling value IC_AD is zero, the second control module 4 detects that the freewheeling ends, the second control module 4 sends a high-level control signal, and the high-level control signal is transmitted to the signal selection switch unit S5 of the driver smart control submodule 31 via the tenth output pin LB_EN of the second control module 4. In this case, the fourth pin A and the first pin B2 of the signal selection switch unit S5 are conducted, and the tenth output pin LB_EN of the second control module 4 sends the signal to the fifth input pin HIN5 of the driver submodule 32. Upon receiving and processing the signal, the driver submodule 32 outputs a low-level signal HO_C to the gate electrode of the MOSFET transistor M5 via the third output pin HO3 of the driver submodule 32, and the MOSFET transistor M5 is turned off, that is, the synchronous rectification is disabled.

Referring to FIG. 2 and FIG. 5, during a commutation from phases BA to phases CA, a freewheeling start signal is transmitted as follows:

At the phase A winding coil of the brushless DC motor 2, a counter electromotive force BEMF_B is generated, a freewheeling current is correspondingly generated, the second control module 4 generates a high-level control signal, and the high-level control signal is transmitted to the signal selection switch unit S4 of the driver smart control submodule 31 via the seventh output pin LIN_A. In this case, the fourth pin A and the third pin B1 of the signal selection switch unit S4 are conducted, such that the high-level control signal is sent to the fourth input pin HIN4 of the driver submodule 32. Upon receiving and processing the signal, the driver submodule 32 outputs a low-level signal LO_B to the gate electrode of the MOSFET transistor M4 via the fifth output pin LO2 of the driver submodule 32, and the MOSFET transistor M4 is turned on, such that a complete freewheeling path is formed, that is, the synchronous rectification is enabled. In this case, the freewheeling direction is as follows:

the phase B winding coil of the brushless DC motor 2—>the phase A winding coil of the brushless DC motor 2—>the first resistor R1—>the MOSFET transistor M2—>the MOSFET transistor M4—>the second resistor R2—>the phase B winding coil of the brushless DC motor 2.

In this case, the first resistor R1 is in a CA-phase loop, a current is constantly present, a freewheeling current is present in the second resistor R2, and as the freewheeling ends, the freewheeling current progressively decreases and eventually becomes zero. In the variation process of the current flowing via the second resistor R2, the operational amplifier U2 connected between the two terminals of the second resistor R2 constantly sends an acquired current sampling value IB_AD to the second control module 4; in the case that the sampling value IB_AD is zero, the second control module 4 detects that the freewheeling ends, the second control module 4 sends a high-level control signal, and the high-level control signal is transmitted to the signal selection switch unit S4 of the driver smart control submodule 31 via the eighth output pin LA_EN of the second control module 4. In this case, the fourth pin A and the first pin B2 of the signal selection switch unit S4 are conducted, and the eighth output pin LA_EN of the second control module 4 sends the signal to the fourth input pin HIN4 of the driver submodule 32. Upon receiving and processing the signal, the driver submodule 32 outputs a low-level signal LO_B to the gate electrode of the MOSFET transistor M4 via the fifth output pin LO2 of the driver submodule 32, and the MOSFET transistor M4 is turned off, that is, the synchronous rectification is disabled.

Referring to FIG. 2 and FIG. 5, during a commutation from phases CA to phases CB, a freewheeling start signal is transmitted as follows:

At the phase A winding coil of the brushless DC motor 2, a counter electromotive force BEMF_A is generated, a freewheeling current is correspondingly generated, the second control module 4 generates a high-level control signal, and the high-level control signal is transmitted to the signal selection switch unit S1 of the driver smart control submodule 31 via the first output pin HIN_A. In this case, the fourth pin A and the third pin B1 of the signal selection switch unit S1 are conducted, such that the high-level control signal is sent to the first input pin HIN1 of the driver submodule 32. Upon receiving and processing the signal, the driver submodule 32 outputs a high-level signal HO_A to the gate electrode of the MOSFET transistor M1 via the first output pin HO1 of the driver submodule 32, and the MOSFET transistor M1 is turned on, such that a complete freewheeling path is formed, that is, the synchronous rectification is enabled. In this case, the freewheeling direction is as follows:

the phase A winding coil of the brushless DC motor 2—>the first resistor R1—>the MOSFET transistor M1—>the MOSFET transistor M5—>the third resistor R3—>the phase C winding coil of the brushless DC motor 2—>the phase A winding coil of the brushless DC motor 2.

In this case, the third resistor R3 is in a CB-phase loop, a current is constantly present, a freewheeling current is present in the first resistor R1, and as the freewheeling ends, the freewheeling current progressively decreases and eventually becomes zero. In the variation process of the current flowing via the first resistor R1, the operational amplifier U1 connected between the two terminals of the first resistor R1 constantly sends an acquired current sampling value IA_AD to the second control module 4; in the case that the sampling value IA_AD is zero, the second control module 4 detects that the freewheeling ends, the second control module 4 sends a high-level control signal, and the high-level control signal is transmitted to the signal selection switch unit S1 of the driver smart control submodule 31 via the second output pin HA_EN of the second control module 4. In this case, the fourth pin A and the first pin B2 of the signal selection switch unit S1 are conducted, and the second output pin HA_EN of the second control module 4 sends the signal to the first input pin HIN1 of the driver submodule 32. Upon receiving and processing the signal, the driver submodule 32 outputs a low-level signal HO_A to the gate electrode of the MOSFET transistor M1 via the first output pin HO1 of the driver submodule 32, and the MOSFET transistor M1 is turned off, that is, the synchronous rectification is disabled.

Referring to FIG. 2 and FIG. 5, during a commutation from phases CB to phases AB, a freewheeling start signal is transmitted as follows:

At the phase A winding coil of the brushless DC motor 2, a counter electromotive force BEMF_C is generated, a freewheeling current is correspondingly generated, the second control module 4 generates a high-level control signal, and the high-level control signal is transmitted to the signal selection switch unit S6 of the driver smart control submodule 31 via the eleventh output pin LIN_C. In this case, the fourth pin A and the third pin B1 of the signal selection switch unit S6 are conducted, such that the high-level control signal is sent to the sixth input pin HIN6 of the driver submodule 32. Upon receiving and processing the signal, the driver submodule 32 outputs a high-level signal LO_C to the gate electrode of the MOSFET transistor M6 via the sixth output pin LO3 of the driver submodule 32, and the MOSFET transistor M6 is turned on, such that a complete freewheeling path is formed, that is, the synchronous rectification is enabled. In this case, the freewheeling direction is as follows:

the phase C winding coil of the brushless DC motor 2—>the phase B winding coil of the brushless DC motor 2—>the second resistor R2—>the MOSFET transistor M4—>the MOSFET transistor M6—>the third resistor R3—>the phase C winding coil of the brushless DC motor 2.

In this case, the second resistor R2 is in a CB-phase loop, a current is constantly present, a freewheeling current is present in the third resistor R3, and as the freewheeling ends, the freewheeling current progressively decreases and eventually becomes zero. In the variation process of the current flowing via the third resistor R3, the operational amplifier U3 connected between the two terminals of the third resistor R3 constantly sends an acquired current sampling value IC_AD to the second control module 4; in the case that the sampling value IC_AD is zero, the second control module 4 detects that the freewheeling ends, the second control module 4 sends a high-level control signal, and the high-level control signal is transmitted to the signal selection switch unit S6 of the driver smart control submodule 31 via the twelfth output pin LC_EN of the second control module 4. In this case, the fourth pin A and the first pin B2 of the signal selection switch unit S6 are conducted, and the twelfth output pin LC_EN of the second control module 4 sends the signal to the sixth input pin HIN6 of the driver submodule 32. Upon receiving and processing the signal, the driver submodule 32 outputs a low-level signal LO_C to the gate electrode of the MOSFET transistor M6 via the sixth output pin LO3 of the driver submodule 32, and the MOSFET transistor M6 is turned off, that is, the synchronous rectification is disabled.

Referring to FIG. 2 and FIG. 5, freewheeling is caused not only in the commutation of the brushless DC motor 2, but also in PWM_OFF of the MOSFET transistor of the brushless DC motor 2. The principles are consistent with those for the commutation of a brushed DC motor. For example, in PWM_OFF of the MOSFET transistor M1:

At the phase A winding coil of the brushless DC motor 2, counter electromotive forces BEMF_A and BEMF_B are generated, a freewheeling current is correspondingly generated, the second control module 4 generates a high-level control signal, and the high-level control signal is transmitted to the signal selection switch unit S2 of the driver smart control submodule 31 via the third output pin HIN_B. In this case, the fourth pin A and the third pin B1 of the signal selection switch unit S2 are conducted, such that the high-level control signal is sent to the second input pin HIN2 of the driver submodule 32. Upon receiving and processing the signal, the driver submodule 32 outputs a high-level signal LO_A to the gate electrode of the MOSFET transistor M2 via the fourth output pin LO1 of the driver submodule 32, and the MOSFET transistor M2 is turned on, such that a complete freewheeling path is formed, that is, the synchronous rectification is enabled. In this case, the freewheeling direction is as follows:

the phase B winding coil of the brushless DC motor 2—>the second resistor R2—>the MOSFET transistor M4—>the MOSFET transistor M2—>the first resistor R1—>the phase A winding coil of the brushless DC motor 2.

In this case, a freewheeling current is constantly present in both the second resistor R2 and the first resistor R1, and as the freewheeling ends, the freewheeling current progressively decreases and eventually becomes zero. In the variation process of the current flowing via the second resistor R2 and the first resistor R1, the operational amplifiers U1 and U2 respectively connected between the two terminals of the second resistor R2 and the first resistor R1 constantly send acquired current sampling values IB_AD and IA_AD to the second control module 4; in the case that the sampling values IB_AD and IA_AD are zero, the second control module 4 detects that the freewheeling ends, the second control module 4 sends a high-level control signal, and the high-level control signal is transmitted to the signal selection switch unit S2 of the driver smart control submodule 31 via the fourth output pin HB_EN of the second control module 4. In this case, the fourth pin A and the first pin B2 of the signal selection switch unit S2 are conducted, and the fourth output pin HB_EN of the second control module 4 sends the signal to the second input pin HIN2 of the driver submodule 32. Upon receiving and processing the signal, the driver submodule 32 outputs a low-level signal LO_A to the gate electrode of the MOSFET transistor M2 via the fourth output pin LO1 of the driver submodule 32, and the MOSFET transistor M2 is turned off, that is, the synchronous rectification is disabled.

Referring to FIG. 2 and FIG. 5, with respect to the freewheeling at a PWM_OFF phase, where the freewheeling duration is greater than a PWM_ON duration of a lower bridge MOSFET transistor due to an over-sized throttle signal (a rotation speed adjustment signal) or other factors, an upper bridge MOSFET transistor and the lower bridge MOSFET transistor are conducted in the case that the lower bridge MOSFET transistor is not turned off at this time. However, dedicated MOSFET transistors having an extremely low on-resistance are employed for the synchronous rectification. That is, the entire bridge arm may be equivalent to a conductive wire having almost no resistance, such that the positive electrode and the negative electrode of the first power supply unit are short-circuited, which damages the circuit structure. To avoid the above case, the second control module 4 acquires the PWM control information of the six MOSFET transistors, calculates the freewheeling time point according to the current sampling value constantly acquired by the operational amplifier, and compares the freewheeling time point with a PWM_ON time point of the lower bridge MOSFET transistor. In the case that the freewheeling time point is later than the PWM_ON time point of the lower bridge MOSFET transistor, the second control module 4 controls the corresponding lower bridge MOSFET transistor to be turned off before the upper bridge MOSFET transistor is turned on. In this way, the synchronous rectification is forcibly disabled, and thus the circuit is protected.

The implementation principles of the intelligent synchronous rectification system of an electronic speed controller according to the embodiment of the present disclosure are as follows: the second control module 4 acquires a real-time rotation speed signal of the brushless DC motor 2 by the Hall sensor 6, compares the real-time rotation speed signal with a predetermined rotation speed signal, and sends a rectification signal to the first control module 3; and the first control module 3 drives the three-phase inverter 1 to operate. The freewheeling detecting module 7 detects in real time the three-phase current in the three-phase inverter 1, and sends a detection signal to the second control module 4; the second control module 4 determines, based on the detection signal, whether freewheeling ends; upon acquiring a freewheeling end signal, the second control module 4 sends a rectification disable signal to the first control module 3; and the first control module 3 controls the corresponding MOSFET transistor in the three-phase inverter 1 to disable the synchronous rectification.

Second Embodiment

Figure 6:
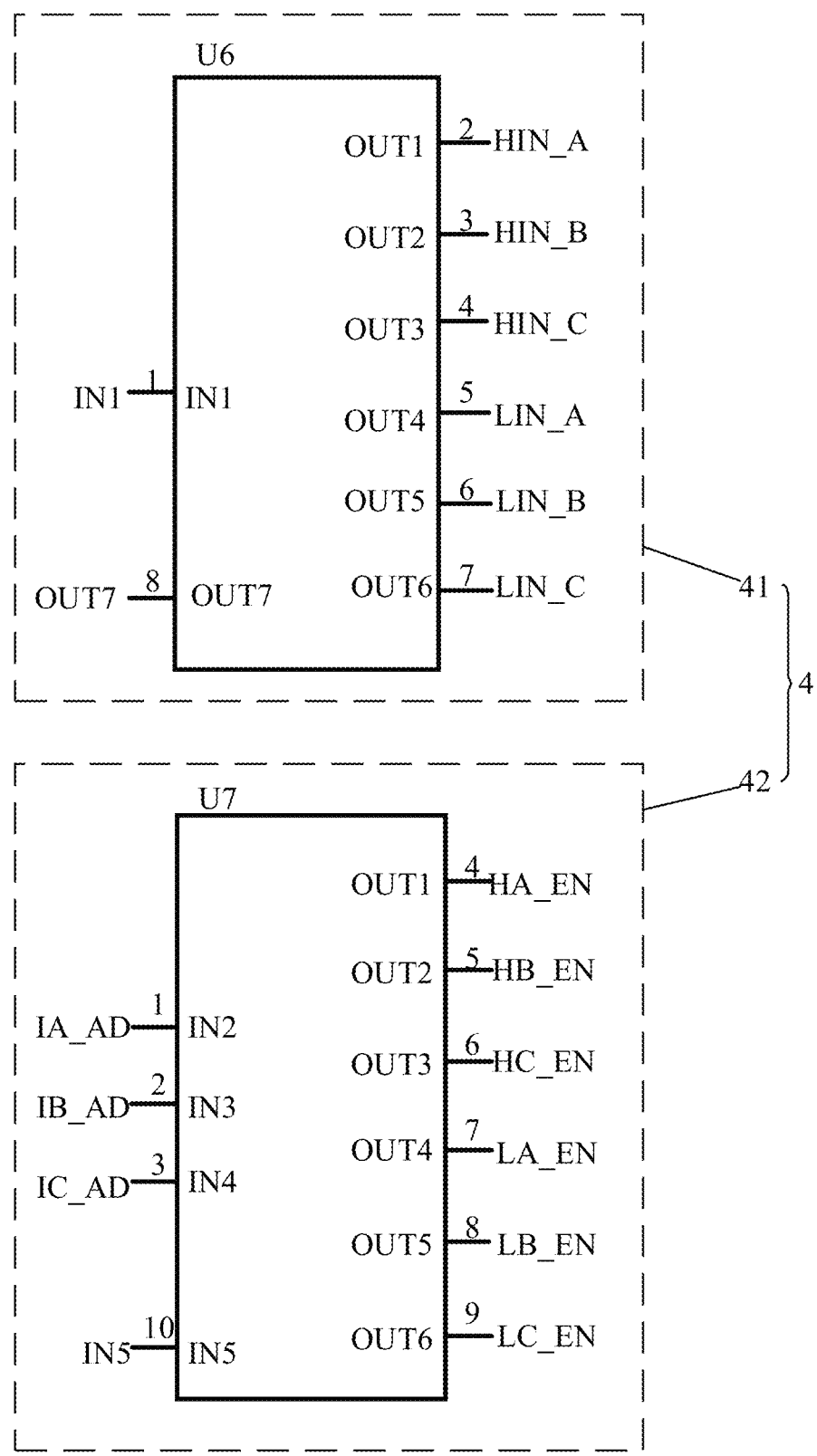
FIG. 6 is a schematic diagram of pins of a second control module according to a second embodiment of the present disclosure.

Referring to FIG. 6, this embodiment is different from the first embodiment in that, in this embodiment, the second control module 4 includes a first control submodule 41 and a second control submodule 42; wherein the first control submodule 41 is configured to acquire a signal of the Hall sensor 6, control the driver smart control submodule 31, and cause the motor to normally operate. IN1 is an input of the first control submodule 41, and HIN_A, HIN_B, HIN_C, LIN_A, LIN_B, and LIN_C are all outputs of the first control submodule 41. IA_AD, IB_AD, and IC_AD are inputs of the second control submodule 42, HA_EN, HB_EN, HC_EN, LA_EN, LB_EN, and LC_ED are all outputs of an MCU 2. The second control submodule 42 is configured to acquire a three-phase current detection signal, timely determine a freewheeling end time, and then control the driver smart control submodule 31 to turn off the driver, that is, turning off the corresponding MOSFET transistor and disabling the synchronous rectification. In this embodiment, the first control submodule 41 and the second control submodule 42 both employ an MCU as a controller.

Referring to FIG. 6, in order to protect the circuit in the case that a freewheeling duration is greater than a PWN_ON duration of the lower bridge MOSFET transistor, the second control submodule 42 needs to acquire PWM control information of six MOSFET transistors from the first control submodule 1 to determine which of the freewheeling duration and the PWN_ON duration of the lower bridge MOSFET transistor is greater. An OUT7 pin configured to output the PWM control information of the six MOSFET transistors is arranged on the first control submodule 41, and an IN5 pin configured to receive the PWM control information of the six MOSFET transistors is arranged on the second control submodule 42. In the case that the freewheeling duration is greater than the PWN_ON duration of the lower bridge MOSFET transistor, the second control submodule 42 timely determines time comparison information, and disables the synchronous rectification timely before conduction of an upper bridge MOSFET transistor. The function of the second control module 4 is implemented by using two submodules. In this way, the calculation load of the second control module 4 is reduced, the response speed is increased, the heat generation of the second control module 4 is lowered, and the operating efficiency is improved.

The implementation principles of the intelligent synchronous rectification system of an electronic speed controller according to the embodiment of the present disclosure are as follows: the first control module 41 acquires a real-time rotation speed signal of the brushless DC motor 2 by the Hall sensor 6, compares the real-time rotation speed signal with a predetermined rotation speed signal, and sends a rectification signal to the first control module 3; and the first control module 3 drives the three-phase inverter 1 to operate. The freewheeling detecting module 7 detects in real time the three-phase current in the three-phase inverter 1, and sends a detection signal to the second control submodule 42; the second control submodule 42 determines, based on the detection signal, whether freewheeling ends; upon acquiring a freewheeling end signal, the second control submodule 42 sends a rectification disable signal to the first control module 3; and the first control module 3 controls the corresponding MOSFET transistor in the three-phase inverter 1 to disable the synchronous rectification.

Third Embodiment

Figure 7:
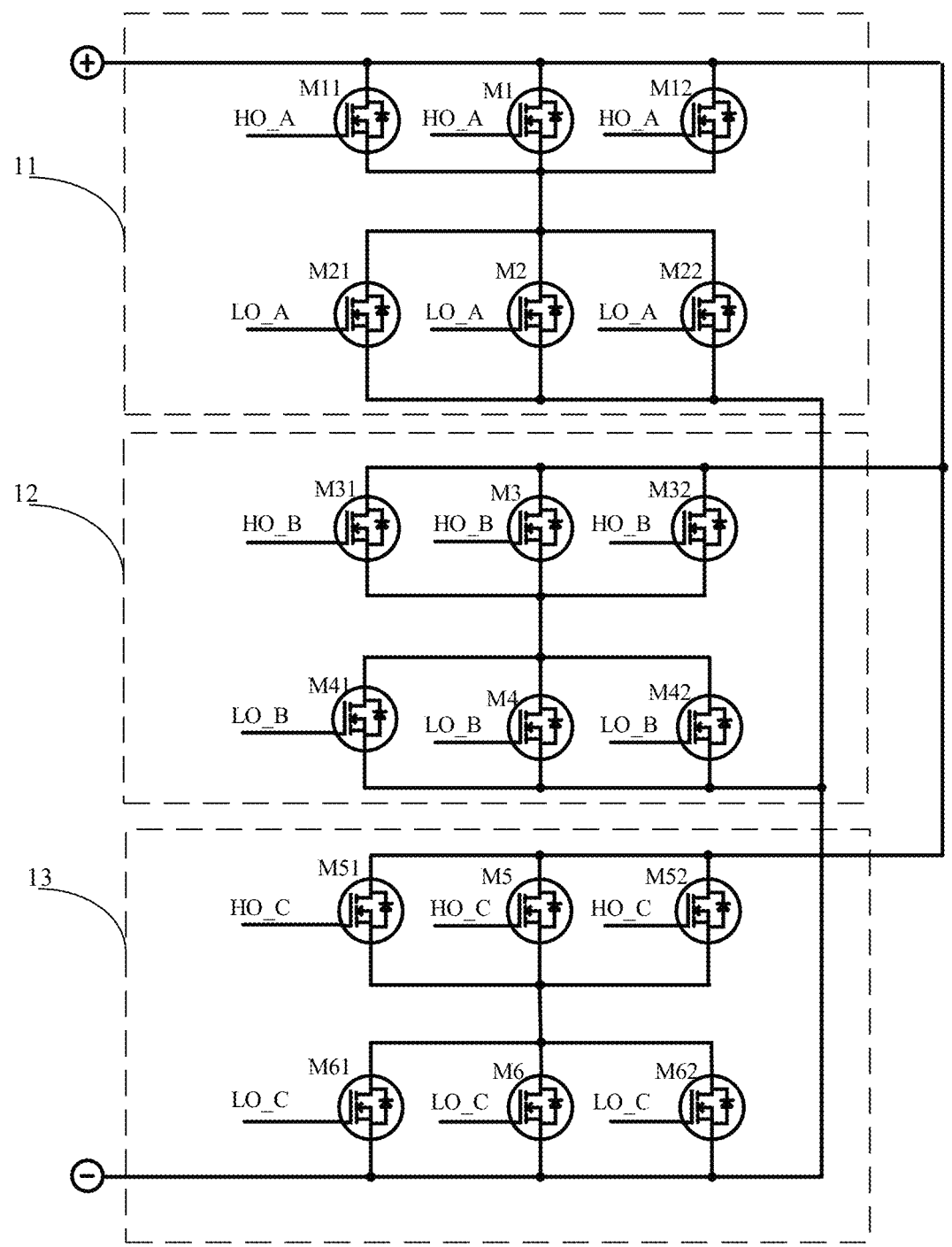
FIG. 7 is a schematic diagram of circuit structure of a three-phase inverter according to a third embodiment of the present disclosure.

Referring to FIG. 7, this embodiment is different from the second embodiment in that, in this embodiment, a plurality of MOSFET transistors are connected in parallel to each of the MOSFET transistors M1, M2, M3, M4, M5, and M6. The drain electrode of a MOSFET transistor is electrically connected to the drain electrodes of the MOSFET transistors connected in parallel thereto, the source electrode of a MOSFET transistor is electrically connected to the source electrodes of the MOSFET transistors connected in parallel thereto, and the gate of a MOSFET transistor receives a signal consistent with signals received by the gates of the MOSFET transistors connected in parallel thereto. In this embodiment, two MOSFET transistors are connected in parallel to each of the MOSFET transistors M1, M2, M3, M4, M5, and M6. Specifically, MOSFET transistors M11 and M12 are connected in parallel to the MOSFET transistor M1, MOSFET transistors M21 and M22 are connected in parallel to the MOSFET transistor M2, MOSFET transistors M31 and M32 are connected in parallel to the MOSFET transistor M3, MOSFET transistors M41 and M42 are connected in parallel to the MOSFET transistor M4, MOSFET transistors M51 and M52 are connected in parallel to the MOSFET transistor M5, and MOSFET transistors M61 and M62 are connected in parallel to the MOSFET transistor M6.

Figure 8:
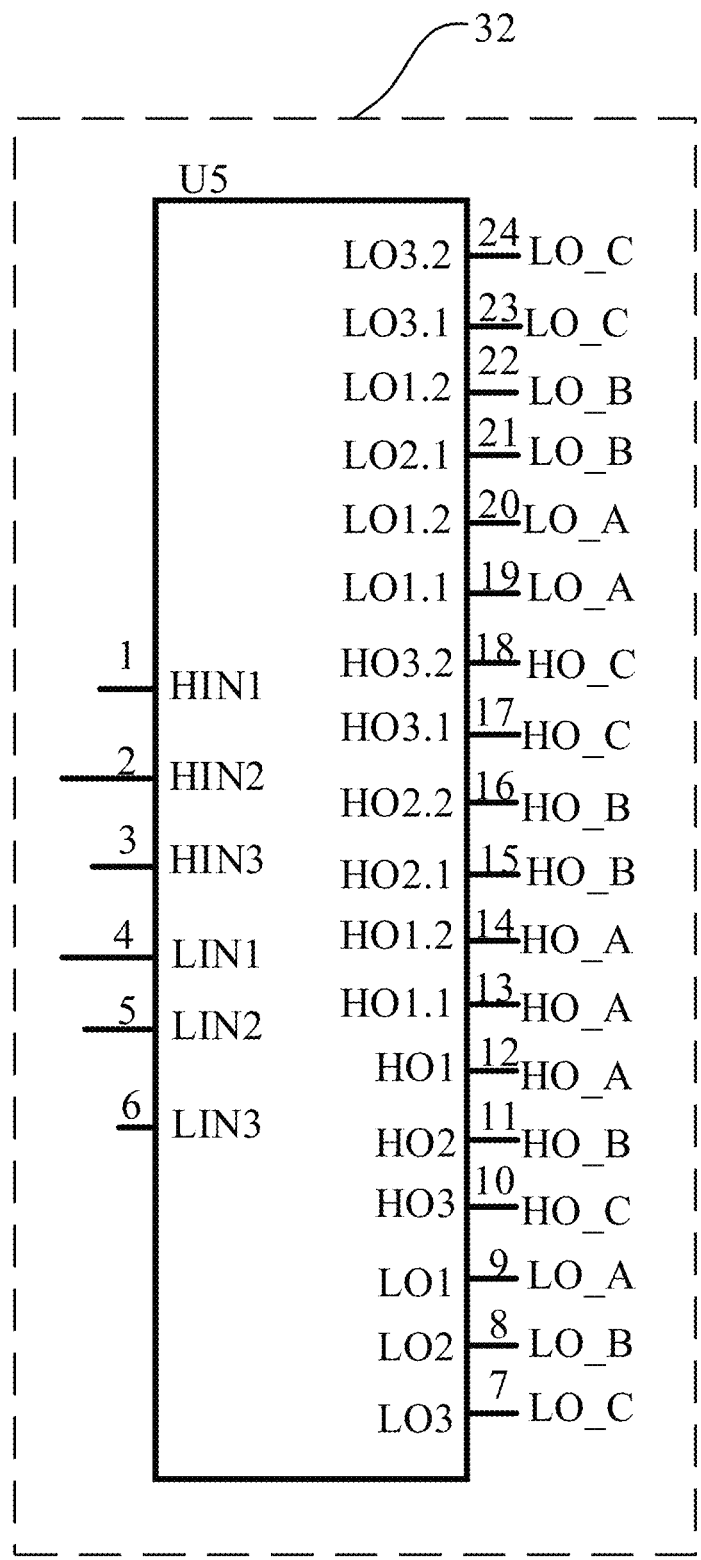
FIG. 8 is a schematic diagram of pins of a driver submodule according to the third embodiment of the present disclosure.

Referring to FIG. 7 and FIG. 8, the driver submodule 33 is provided with a plurality of pins that are connected to gate electrodes of MOSFET transistors that are connected in parallel.

On the driver submodule 33, an output pin HO1.1 is electrically connected to a gate electrode of the MOSFET transistor M11, an output pin HO1.2 is electrically connected to a gate electrode of the MOSFET transistor M12, and output signals of the output pin HO1.1 and the output pin HO1.2 are consistent with an output signal of a first output pin HO1.

On the driver submodule 33, an output pin HO2.1 is electrically connected to a gate electrode of the MOSFET transistor M21, an output pin HO2.2 is electrically connected to a gate electrode of the MOSFET transistor M22, and output signals of the output pin HO2.1 and the output pin HO2.2 are consistent with an output signal of a second output pin HO2.

On the driver submodule 33, an output pin HO3.1 is electrically connected to a gate electrode of the MOSFET transistor M31, an output pin HO3.2 is electrically connected to a gate electrode of the MOSFET transistor M32, and output signals of the output pin HO3.1 and the output pin HO3.2 are consistent with an output signal of a third output pin HO3.

On the driver submodule 33, an output pin LO1.1 is electrically connected to a gate electrode of the MOSFET transistor M41, an output pin LO1.2 is electrically connected to a gate electrode of the MOSFET transistor M42, and output signals of the output pin LO1.1 and the output pin LO1.2 are consistent with an output signal of a fourth output pin LO1.

On the driver submodule 33, an output pin LO2.1 is electrically connected to a gate electrode of the MOSFET transistor M51, an output pin LO2.2 is electrically connected to a gate electrode of the MOSFET transistor M52, and output signals of the output pin LO2.1 and the output pin LO2.2 are consistent with an output signal of a fifth output pin LO2.

On the driver submodule 33, an output pin LO3.1 is electrically connected to a gate electrode of the MOSFET transistor M61, an output pin LO3.2 is electrically connected to a gate electrode of the MOSFET transistor M62, and output signals of the output pin LO3.1 and the output pin LO3.2 are consistent with an output signal of a sixth output pin LO3.

Since when the electric RC model cars and the like models operate in a full-throttle state (a maximum operating state), the current may be great. By connecting a plurality of MOSFET transistors in parallel to each of the MOSFET transistors M1, M2, M3, M4, M5, and M6, the conduction current shouldered on each of the MOSFET transistors may be effectively reduced, thereby achieving a shunting effect and reducing heat generation of the electronic speed controller.

The implementation principles of the intelligent synchronous rectification system of an electronic speed controller according to the embodiment of the present disclosure are as follows: the first control module 41 acquires a real-time rotation speed signal of the brushless DC motor 2 by the Hall sensor 6, compares the real-time rotation speed signal with a predetermined rotation speed signal, and sends a rectification signal to the first control module 3; and the first control module 3 drives the three-phase inverter 1 to operate. The freewheeling detecting module 7 detects in real time the three-phase current in the three-phase inverter 1, and sends a detection signal to the second control submodule 42; the second control submodule 42 determines, based on the detection signal, whether freewheeling ends; upon acquiring a freewheeling end signal, the second control submodule 42 sends a rectification disable signal to the first control module 3; and the first control module 3 controls the corresponding plurality of MOSFET transistors in the three-phase inverter 1 to disable the synchronous rectification.

An embodiment of the present disclosure further provides a control method for the intelligent synchronous rectification system of an electronic speed controller.

The control method for the intelligent synchronous rectification system of an electronic speed controller includes:
  step 1, acquiring a motor rotation speed set signal and a real-time rotation speed signal, comparing the motor rotation speed set signal with the real-time rotation speed signal, and generating a pulse width modulated signal by performing pulse width modulation based on a comparison result;
  step 2, generating, based on the pulse width modulated signal, a three-phase inverter on signal configured to enable synchronous rectification of the three-phase inverter 1;
  step 3, acquiring a freewheeling current in real time, and acquiring a freewheeling end signal based on a variation of the freewheeling current; and
  step 4, generating, based on the freewheeling end signal, a three-phase inverter off signal configured to disable synchronous rectification of the three-phase inverter 1.

With respect to the case where in the freewheeling at the PWM_OFF phase, the freewheeling duration is greater than the PWM_ON duration of the lower bridge MOSFET transistor, step 4 includes:
  step 41, acquiring pulse width modulation control information of the three-phase inverter 1;
  step 42, acquiring a freewheeling current sampling value, and calculating an estimated freewheeling time point;
  step 43, comparing the estimated freewheeling time point with a pulse width modulation control enable time point; and
  step 44, generating, based on a comparison result, the three-phase inverter off signal configured to disable synchronous rectification of the three-phase inverter 1.

Described above are exemplary embodiments of the present disclosure, which are not intended to limit the protection scope of the present disclosure. Therefore, any equivalent variations derived based on the structure, shape, and principles of the present disclosure shall all fall within the protection scope of the present disclosure.

What is claimed is:
1. An intelligent synchronous rectification system of an electronic speed controller, comprising:
  a Hall sensor, disposed on an outer periphery of a brushless DC motor, and configured to acquire rotor position information of the brushless DC motor;
  a second control module, signally connected to the Hall sensor, configured to receive the rotor position information from the Hall sensor and generate a synchro- nous rectification enable or disable signal, and further configured to generate a freewheeling end signal;

a three-phase inverter, electrically connected to a winding coil of the brushless DC motor, and configured to drive the brushless DC motor to rotate;

a first control module, signally connected to the three-phase inverter, and configured to receive the synchronous rectification enable or disable signal or the freewheeling end signal from the second control module, and control the three-phase inverter based on the synchronous rectification enable or disable signal or the freewheeling end signal;

a freewheeling detecting module, electrically connected between the three-phase inverter and the brushless DC motor, signally connected to the second control module, and configured to detect a three-phase current in the three-phase inverter and send a signal to the second control module;

a power module, configured to supply power to the three-phase inverter, the first control module, the second control module, the Hall sensor, and the freewheeling detecting module;

wherein the first control module comprises a driver smart control submodule and a driver submodule; wherein the driver smart control submodule is signally connected to the driver submodule and the second control module, and is configured to receive the synchronous rectification enable or disable signal or the freewheeling end signal from the second control module, and process the synchronous rectification enable or disable signal or the freewheeling end signal and send the processed signal to the driver submodule;

wherein the driver smart control submodule comprises a plurality of signal select switch units; wherein the signal select switch unit is signally connected to the second control module and the driver submodule, and is configured to generate an on signal or an off signal based on the synchronous rectification enable or disable signal or the freewheeling end signal from the second control module, and send the on signal or the off signal to the driver submodule; and wherein the driver submodule is signally connected to the three-phase inverter, and is configured to receive the on signal or the off signal from the driver smart control submodule, and control turn-on or turn-off of the three-phase inverter based on the on signal or the off signal.

2. The intelligent synchronous rectification system of an electronic speed controller according to claim 1, wherein the three-phase inverter comprises a first bridge arm, a second bridge arm, and a third bridge arm; wherein one terminal of each of the first bridge arm, the second bridge arm, and the third bridge arm is electrically connected to a positive electrode of the power module, and the other terminal of each of the first bridge arm, the second bridge arm, and the third bridge arm is electrically connected to a negative electrode of the power module.

3. The intelligent synchronous rectification system of an electronic speed controller according to claim 2, wherein the freewheeling detecting module comprises a plurality of resistors connected to the bridge arms and operational amplifiers in a quantity corresponding to a quantity of the resistors; wherein an inverting input terminal a and a non-inverting input terminal b of the operational amplifier are respectively connected to two terminals of a corresponding resistor, and an output terminal o of the operational amplifier is signally connected to the second control module.

4. A control method for the intelligent synchronous rectification system of an electronic speed controller, applicable to the smart synchronous rectifier system for the electronic speed controller as defined in claim 1, the method at least comprising: acquiring a motor rotation speed set signal and a real-time rotation speed signal, comparing the motor rotation speed set signal with the real-time rotation speed signal, and generating a pulse width modulated signal by performing pulse width modulation based on a comparison result; generating, based on the pulse width modulated signal, a three-phase inverter on signal configured to enable synchronous rectification of the three-phase inverter, acquiring a freewheeling current in real time, and acquiring a freewheeling end signal based on a variation of the freewheeling current; and generating, based on the freewheeling end signal, a three-phase inverter off signal configured to disable synchronous rectification of the three-phase inverter.

5. The control method for the intelligent synchronous rectification system of an electronic speed controller according to claim 4, wherein generating, based on the freewheeling end signal, a three-phase inverter off signal configured to disable synchronous rectification of the three-phase inverter comprises:

acquiring pulse width modulation control information of the three-phase inverter;

acquiring a freewheeling current sampling value, and calculating an estimated freewheeling time point;

comparing the estimated freewheeling time point with a pulse width modulation control enable time point; and generating, based on a comparison result, the three-phase inverter off signal configured to disable synchronous rectification of the three-phase inverter.

* * * * *